(12) United States Patent
Malone, Jr.

(10) Patent No.: US 7,946,598 B1
(45) Date of Patent: May 24, 2011

(54) HAND CART HAVING ONE PIECE PLASTIC FRAME USEFUL AS A TWO WHEEL HAND CART AND FOUR WHEEL CONFIGURATION AND METHOD OF MANUFACTURING SAME

(75) Inventor: William E. Malone, Jr., Goshen, IN (US)

(73) Assignee: Gleason Industrial Products, Inc., Goshen, IN (US)

( * ) Notice: Subject to any disclaimer, the term of this patent is extended or adjusted under 35 U.S.C. 154(b) by 851 days.

(21) Appl. No.: 10/448,096

(22) Filed: May 29, 2003

(51) Int. Cl.
*B62B 1/12* (2006.01)

(52) U.S. Cl. ............. 280/47.27; 280/47.35; 280/47.371; 280/47.18; 280/47.19

(58) Field of Classification Search ............... 280/47.34, 280/47.35, 47.371, 47.131, 47.17, 47.18, 280/47.19, 47.24, 47.27, 47.28
See application file for complete search history.

(56) References Cited

U.S. PATENT DOCUMENTS

| | | | |
|---|---|---|---|
| 530,991 A | 12/1894 | Grieb | |
| 1,192,790 A | 7/1916 | Knapp | |
| 3,927,898 A | 12/1975 | Weyrauch | |
| 4,563,014 A * | 1/1986 | Mortenson | 280/47.18 |
| RE32,510 E | 9/1987 | Tisbo et al. | |
| 5,533,742 A | 7/1996 | Peart | |
| D384,467 S | 9/1997 | Stallbaumer | |
| 5,749,588 A * | 5/1998 | Stallbaumer | 280/47.27 |
| 5,749,588 A | 5/1998 | Stallbaumer | |
| D395,105 S | 6/1998 | Stallbaumer | |
| 5,947,492 A * | 9/1999 | Hallberg, Jr. | 280/47.24 |
| 6,308,967 B1 * | 10/2001 | Stallbaumer et al. | 280/47.18 |
| 6,364,328 B1 * | 4/2002 | Stahler, Sr. | 280/47.18 |
| 6,478,393 B2 * | 11/2002 | Kim et al. | 312/334.12 |
| 6,481,727 B1 * | 11/2002 | Stallbaumer | 280/47.24 |
| 6,588,775 B2 * | 7/2003 | Malone, Jr. | 280/47.18 |
| 6,758,482 B2 * | 7/2004 | Stallbaumer | 280/47.27 |
| 6,786,496 B2 * | 9/2004 | Ward et al. | 280/250.1 |

OTHER PUBLICATIONS

W W Grainger, Inc. Catalog.re Hand Trucks on pp. 2260-2262, Featuring Grainger Item # 4W323, Available on Internet at www.grainger.com—5 Pages of Printout Dated Dec. 14, 2002—Note Catalog p. 2261 Showing Nylon Composite Frame, Convertible Hand Truck.

* cited by examiner

*Primary Examiner* — J. Allen Shriver, II
*Assistant Examiner* — Erez Gurari
(74) *Attorney, Agent, or Firm* — Edward J. Da Rin; Edward J. Darin, Inc.

(57) ABSTRACT

A frame for a two wheeled hand cart comprising a single frame useful for a two wheel or four wheel hand cart that is constructed and designed of a molded plastic in a single unitary piece comprising a pair of side frames joined by spaced apart cross rails integrally molded with each of the side rails at pre-selected spaced apart locations to form a molded plastic, rigid frame for receiving handles and wheel assemblies in a frame of improved strength and life.

12 Claims, 14 Drawing Sheets

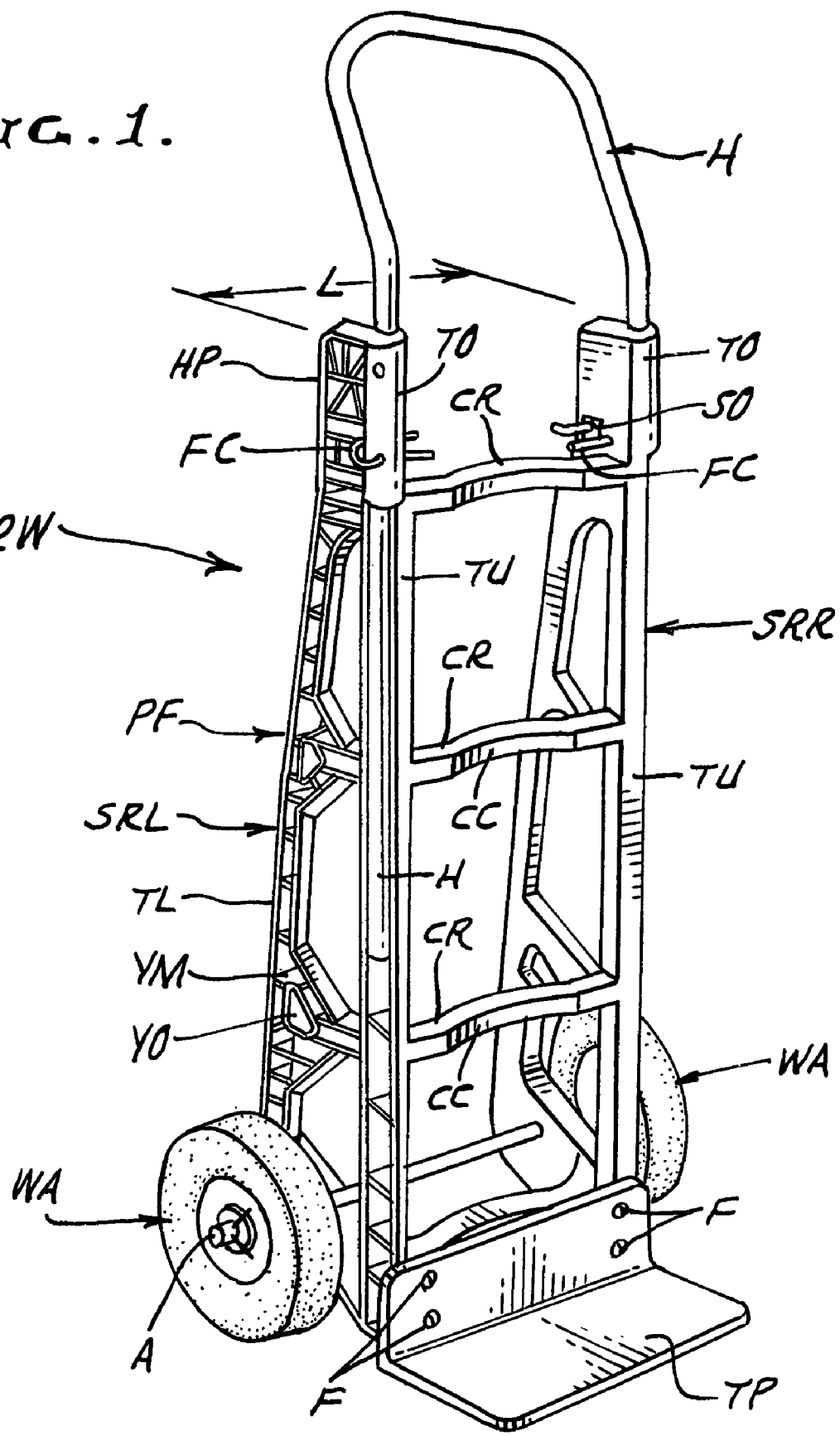

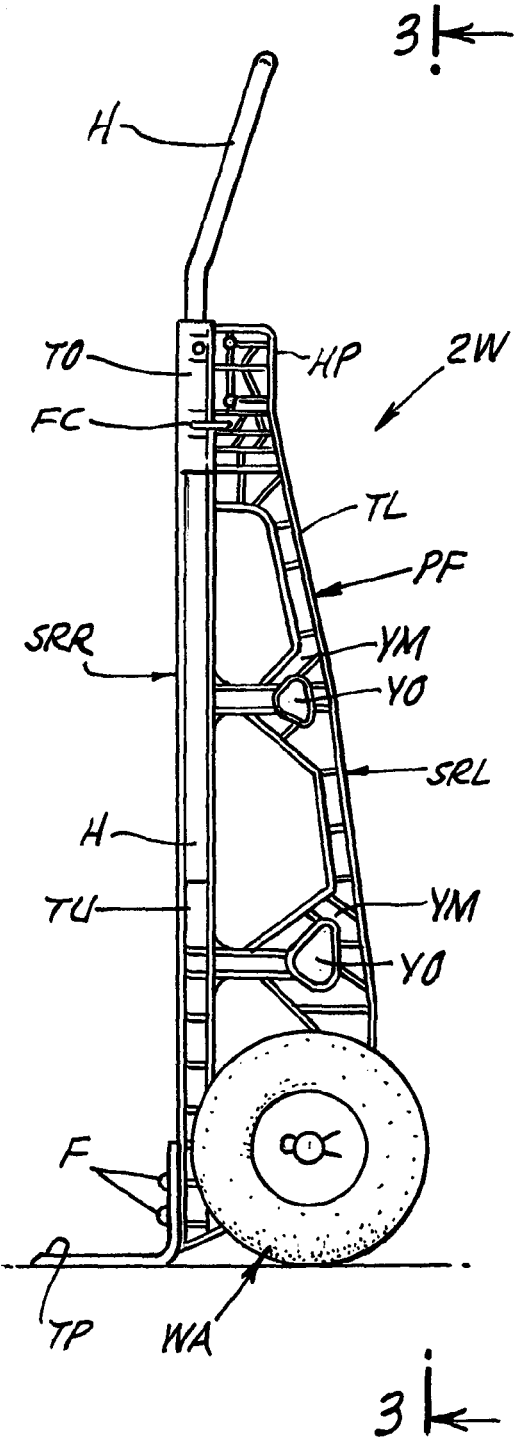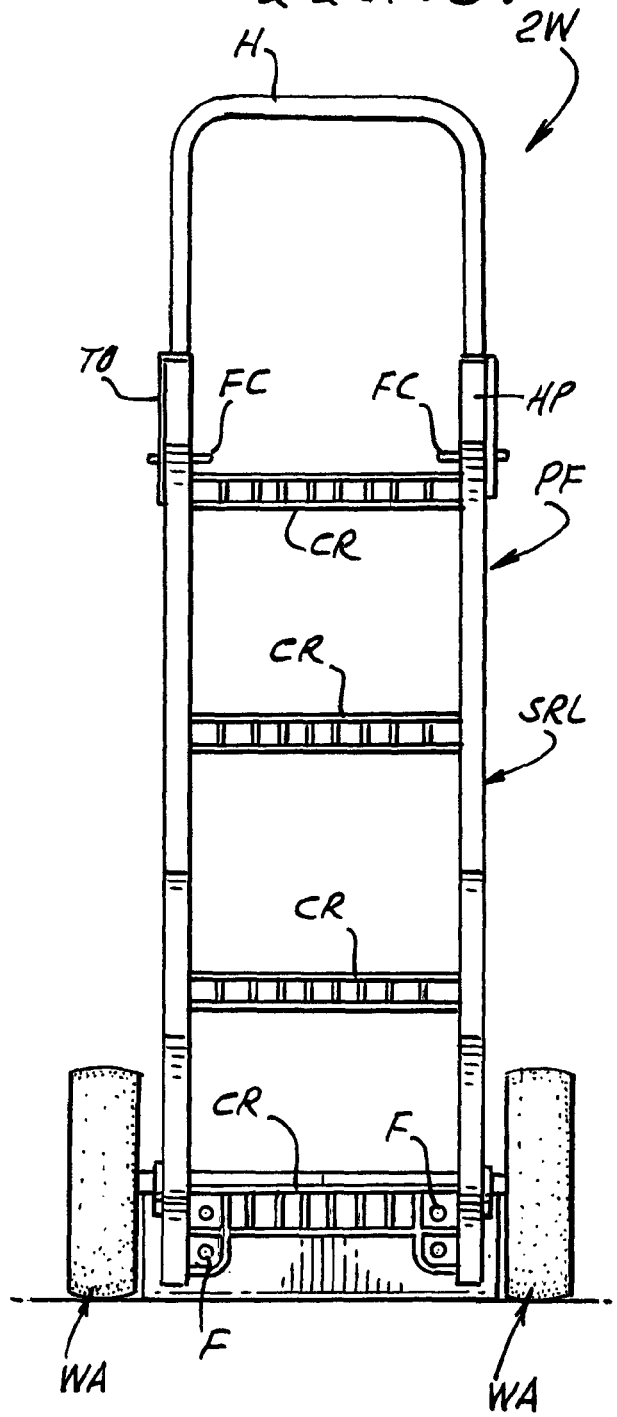

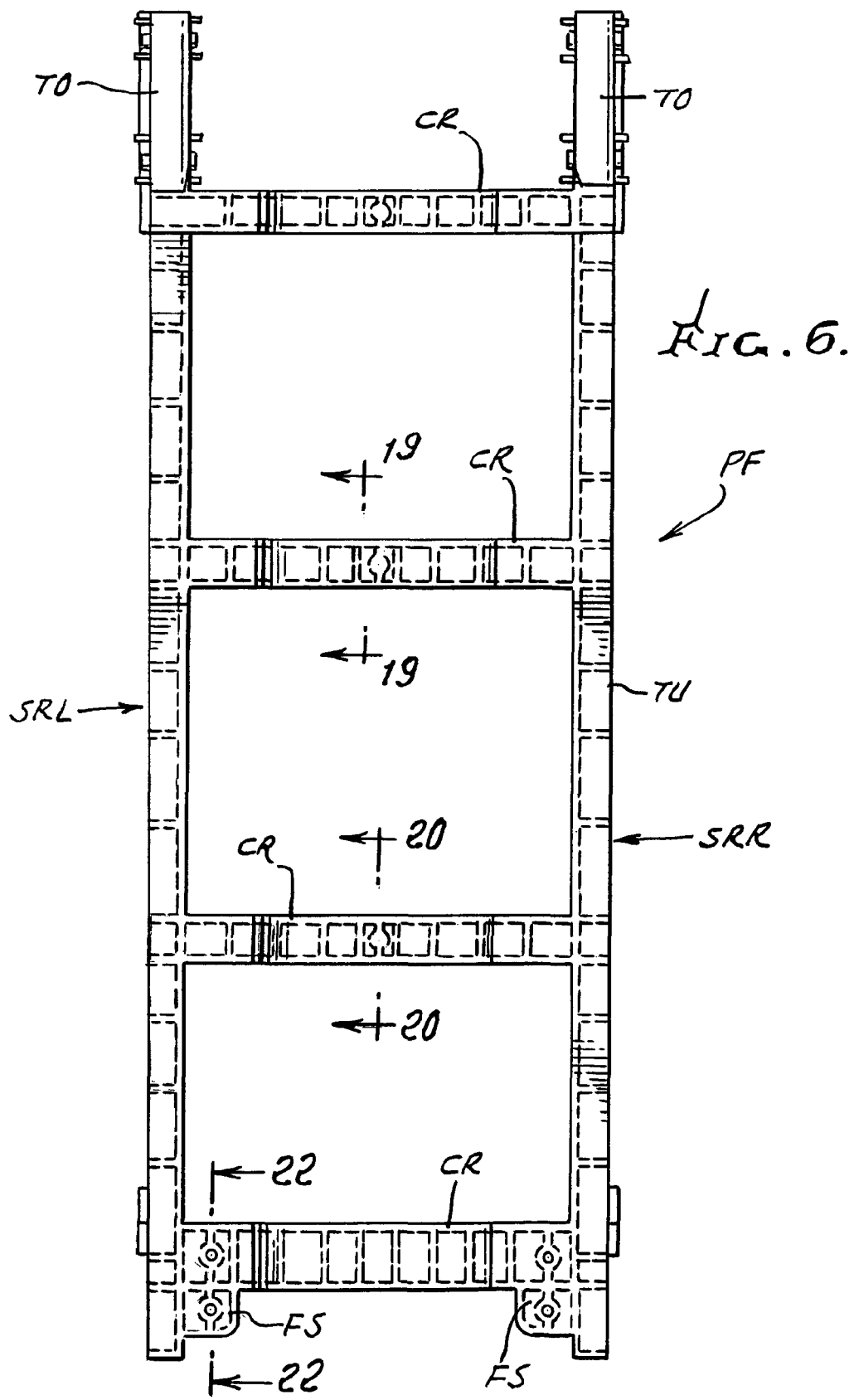

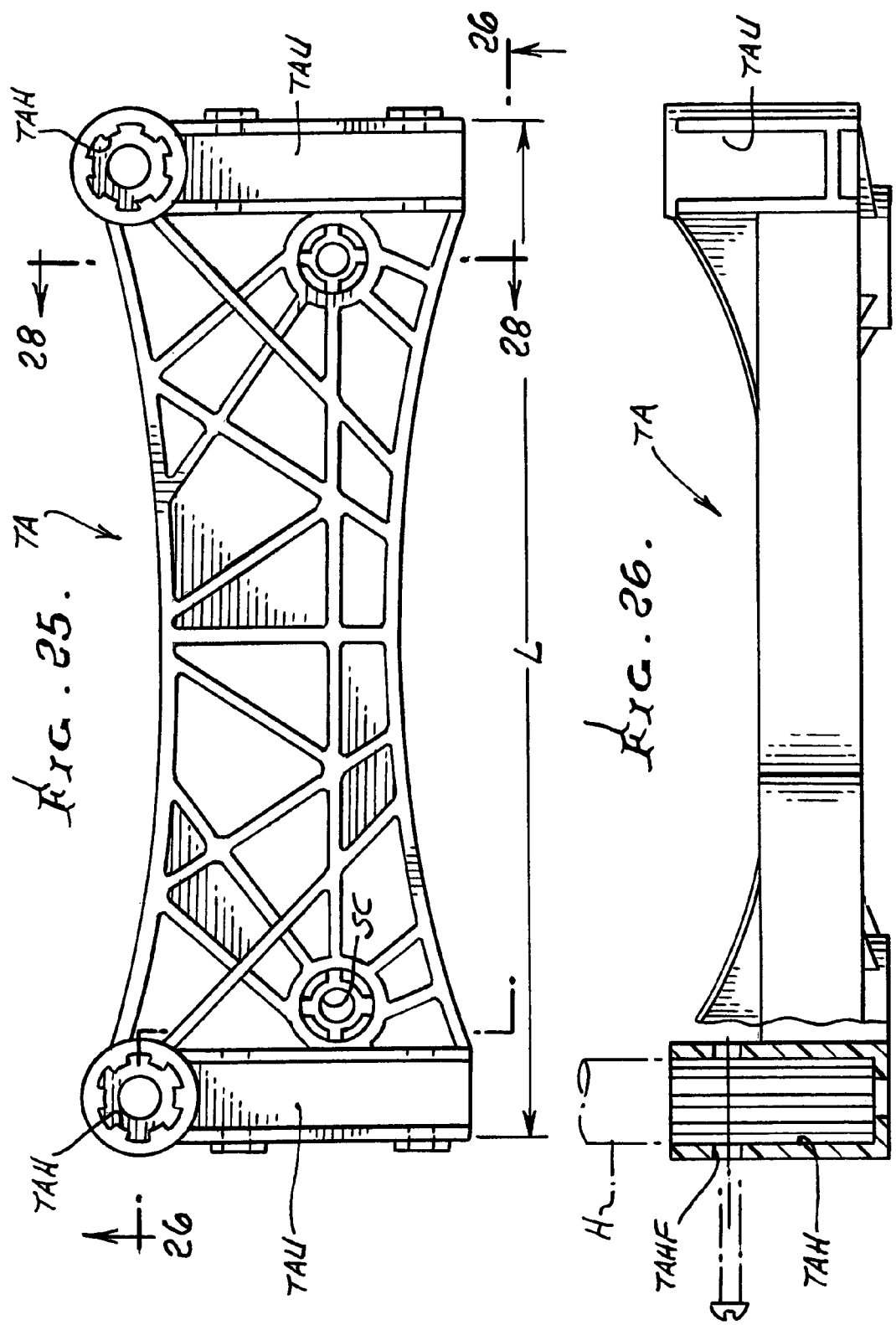

HAND CART HAVING ONE PIECE PLASTIC FRAME USEFUL AS A TWO WHEEL HAND CART AND FOUR WHEEL CONFIGURATION AND METHOD OF MANUFACTURING SAME

FIELD OF INVENTION

This invention relates to a method for manufacturing and apparatus for a two wheel hand cart including a one piece plastic frame and reversibly convertible between the two wheel hand cart configuration to a four wheel hand cart configuration.

BACKGROUND OF INVENTION

Two wheel hand carts are well known in the prior art and are usually constructed of a metallic frame with components thereof secured in place or locked to the metallic frame for providing the necessary well known structure defining a two wheel hand cart. One typical prior art hand cart is disclosed in U.S. Pat. No. 4,563,014 wherein the primary cart frame includes one piece plastic cross rails secured to a metallic frame. Similarly, a prior art hand cart is disclosed in the Stallbaumer Reexamination Certificate B15,749,588 issued on Nov. 21, 2000 and U.S. Pat. No. 5,749,588 that discloses molded plastic side rails adapted to be secured to individual plastic cross rails. The reexamined Stallbaumer patent also discloses side rails in the form of individual open trusses, molded of a plastic, for carrying and distributing the cart loads. These molded plastic trusses were previously utilized for hand trucks but were constructed and formed of rigid materials such as disclosed in the Grieb U.S. Pat. No. 530,991 and the Knapp U.S. Pat. No. 1,192,790.

Grainger is a large distributor of industrial products that includes hand carts and trucks. The Grainger catalogue for carts and trucks is available on the internet and can be accessed at www.grainger.com. The Grainger catalogue includes convertible hand trucks constructed of steel, aluminum and composite materials. The Grainger model No. 4ZJ32 disclosed in the catalogue is partially constructed of plastic parts (not a simple plastic frame) including a transition attachment for converting the hand cart between two wheel and four wheel configurations utilizing the same handle for both configurations.

The prior art U.S. Pat. No. 4,563,014 suggests the construction of the basic frame for a hand cart to be fabricated of a single piece of a light weight sheet metal pressed into the desired shape. This patent also suggests the use of non-metallic plastic sheets for the basic frame but not further disclosed or detailed in the U.S. Pat. No. 4,563,014, see column 1, lines 63 and 64.

Various useful articles are known in the prior art that are fabricated completely of plastic including a single piece plastic bicycle frame per U.S. Pat. No. 5,533,742. Similarly, known hose storage apparatus is constructed entirely of plastic such as disclosed in U.S. Pat. No. Re. 32,510.

Whatever materials are selected to fabricate and form the structure of a hand cart, exclusive of the common wheel structures and handles, etc., the present day hand truck requires locking various sections such as cross rails and side rails to each other that with usage tend to result in the locked sections becoming lose including as a result of the tolerances built into the locked elements and thereby resulting in reducing the useful life of the hand cart, if not the complete breakage of the locked elements, such as the cross rails for the cart. To my knowledge, no all plastic frame for a hand cart is presently available that is commercially acceptable either in the form of a two wheel hand cart, four wheel hand cart or a hand cart convertible between the two wheel and four wheel configurations. Accordingly, there is a present need for a hand cart that has a one piece frame wherein all elements of the frame are formed in one integral part that eliminates the need for locking the various elements together and thereby eliminates the loosening of the locked elements for the frame so as to result in a hand cart of improved and longer useful life and a stronger hand cart structure over the useful life; as well as simplifying the method of manufacturing and assembling the desired hand cart.

SUMMARY OF THE INVENTION

The present invention provides an improved hand cart of increased structural strength and relatively light weight, relatively simple in construction and assembly utilizing a single, unitary frame molded of an engineered polymer plastic material of high strength for a two wheel hand cart that eliminates the need for locking and/or securing various elements of the frame of the frame to one another that eventually leads to the loosening of the locked parts and/or the breakage thereof and can be economically manufactured and assembled with conventional hand cart elements, i.e. handles, wheel assemblies, toe plates and the like. The single unitary frame constructed of a molded plastic includes a pair of longitudinally extending side rails joined by a plurality of integrally connected cross rails spaced apart along the length of the side rails. Each of the rails are each molded so as to comprise a further longitudinally extending member arranged with and joined to the first mentioned individual side rail to form an open truss. The longitudinally extending members are spaced apart by a plurality of Y-like members spaced between the individual members forming the open truss and located at the cross rails and integrally formed therewith. One end of the unitary frame includes tubular ends formed to slidably receive an individual end of a U-shaped cart handle therein to be secured to the frame. The U-shaped handle has its arms extending beyond the ends of the tubular sections for the unitary frame so as to lie within the C-shaped cross sectional configurations of the individual side rails and thereby reinforce the unitary frame. The side rails mount a wheel axle to the frame adjacent the opposite end of the frame from the cart handle receiving ends. The cart is completed by mounting wheel assemblies to the opposite ends of the axle on the outside of the unitary frame and attaching a toe plate to the frame adjacent the axle. The toe plate is secured to the frame to directly transmit the loads applied to the toe plate to the single frame.

The cross rails for the frame may have a curved configuration between their ends for accommodating round barrels or similar objects to prevent these objects from rolling off of the cart.

The present invention further contemplates the provision of a transition attachment that may be in the form of a kit for converting the two wheeled hand cart of the present invention to a four wheel hand cart with a horizontal load bearing platform for loading articles to be transported utilizing the handle for the two wheel hand cart. The transition attachment is constructed and defined for mounting the handle in a plane substantially perpendicular to the horizontal load bearing platform. The transition attachment is further constructed and defined with means for mounting a pair of spaced wheel assemblies such as swiveling casters. The transition attachment is further defined with a member having a length selected to span the distance between the upright side rails of the two wheel cart and to be mounted adjacent on the end of each side rail. The attachment in accordance with the present invention is molded of a plastic and formed with straight walls forming a U-like opening for slidably receiving, in a press fit relationship, the opposite flat surface of a side rail for the unitary frame, when pressed thereto, with individual tubular openings closing one end of each U-like opening and adapted for receiving and securing one end of a U-shaped cart handle therein.

BRIEF DESCRIPTION OF THE DRAWINGS

These and other features of the present invention may be more fully appreciated when considered in light of the following specification and drawings, in which:

FIG. 1 is a perspective view of a two wheel hand cart embodying the invention;

FIG. 2 is a side elevational view of the hand cart of FIG. 1;

FIG. 3 is a rear elevational view of the hand cart of FIG. 1;

FIG. 4 is an exploded view of the hand cart of FIG. 1 and illustrating the simple method of assembly;

FIG. 6 is a front elevational view of the unitary frame, taken along the line 6-6 of FIG. 5;

FIG. 25 is a top plan view of the conversion attachment per se positioned on the unitary frame as illustrated in FIG. 23;

FIG. 26 is a view taken along the line 26-26 of FIG. 25, and illustrating the positioning of the handle in dotted outline;

DETAILED DESCRIPTION OF THE PREFERRED EMBODIMENT

Figure 9:
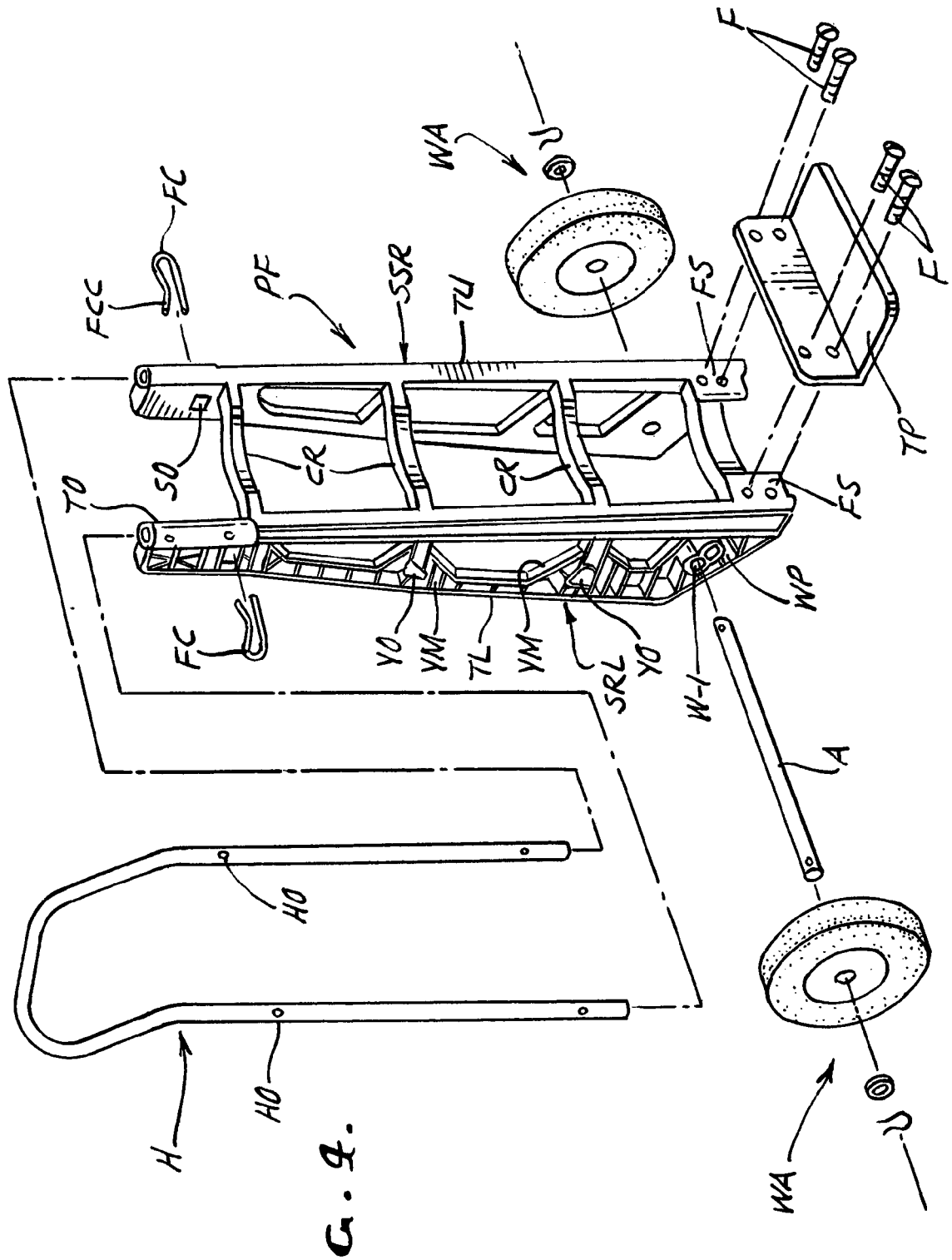
FIG. 9 is a partial, enlarged view of the top portion of the unitary frame as illustrated in FIG. 7, with the cart handle secured thereto.
Figure 5:
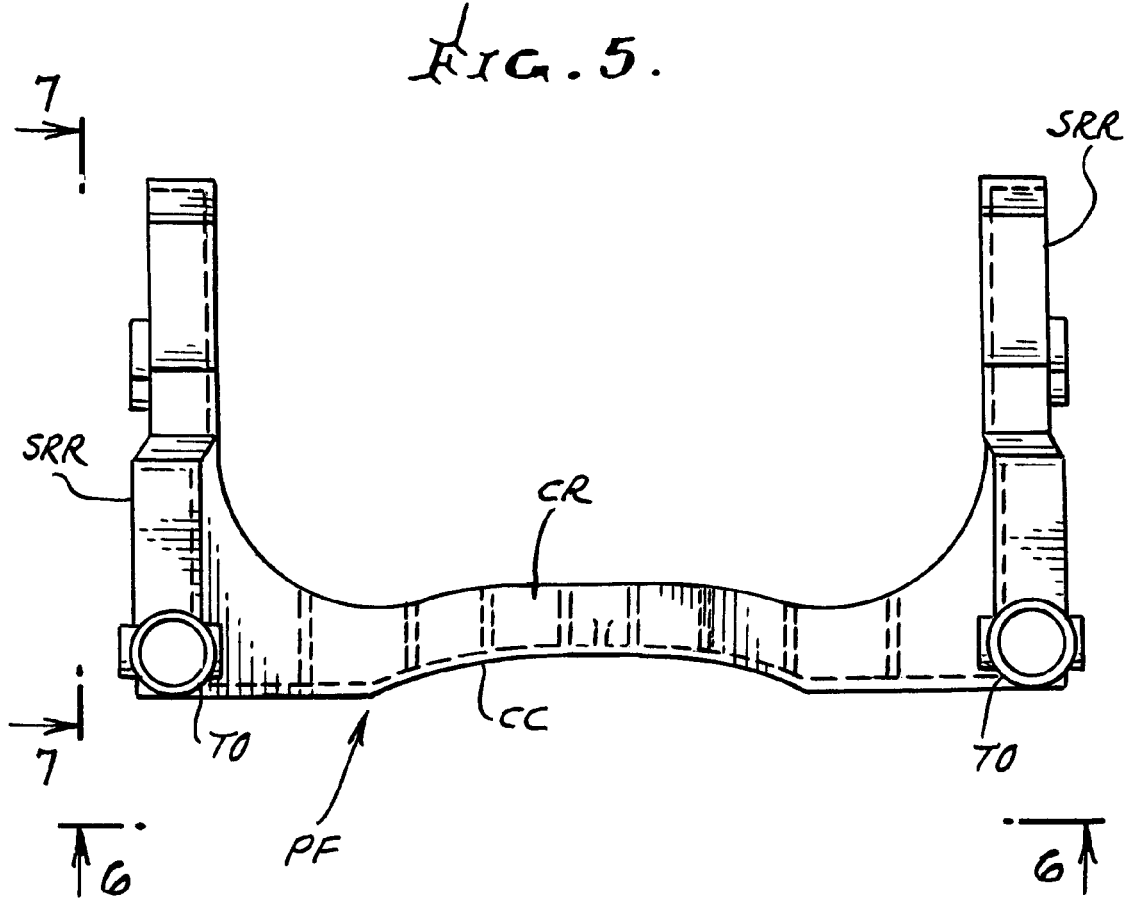
FIG. 5 is a top plan view of the single piece frame as illustrated in FIG. 4.
Figure 13A:
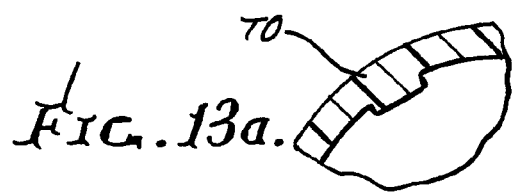
FIG. 13*a* is an enlarged portion of the circular area of 13*a* of FIG. 13.
Figure 13:
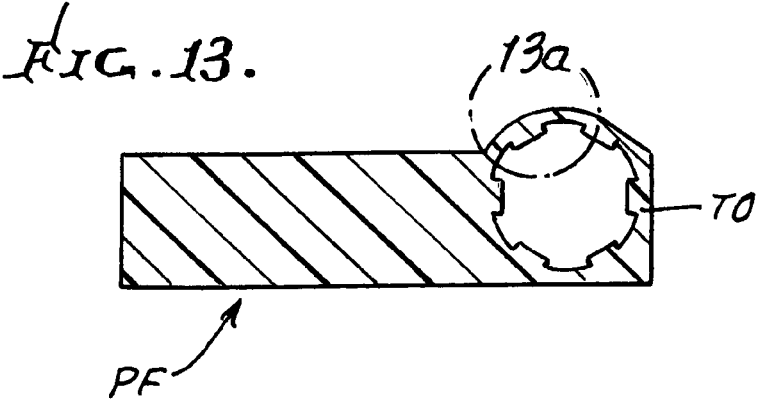
FIG. 13 is a cross-sectional view taken along the line 13-13 of FIG. 8.
Figure 7:
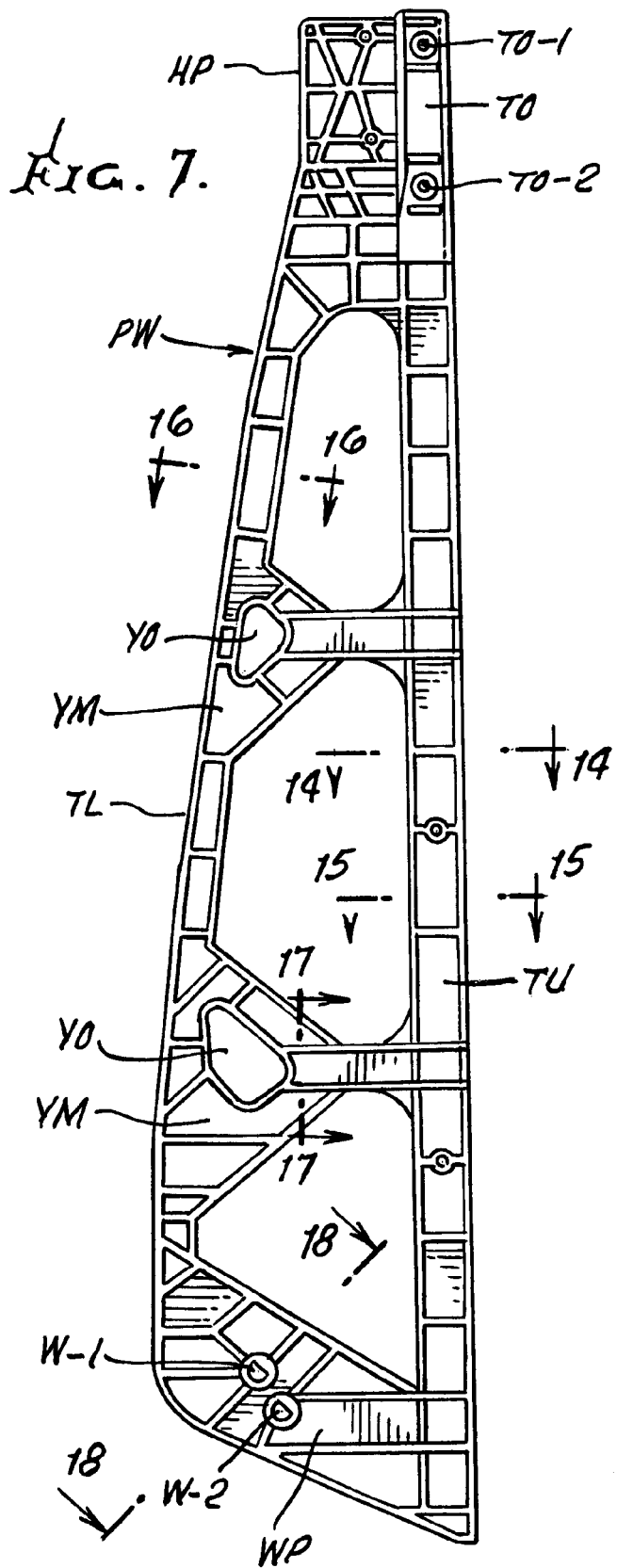
FIG. 7 is a side elevational view of the unitary frame, taken along the line 7-7 of FIG. 5.
Figure 14:
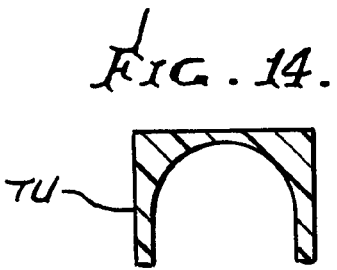
FIG. 14 is a cross-sectional view taken along the line 14-14 of FIG. 7.
Figure 15:
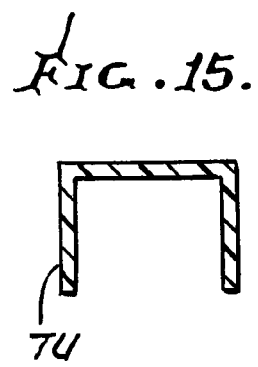
FIG. 15 is a cross-sectional view taken along the line 15-15 of FIG. 7.
Figure 16:
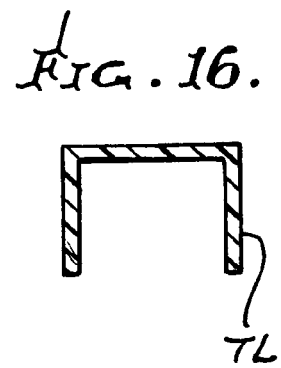
FIG. 16 is a cross-sectional view taken along the line 16-16 of FIG. 7.
Figure 8:
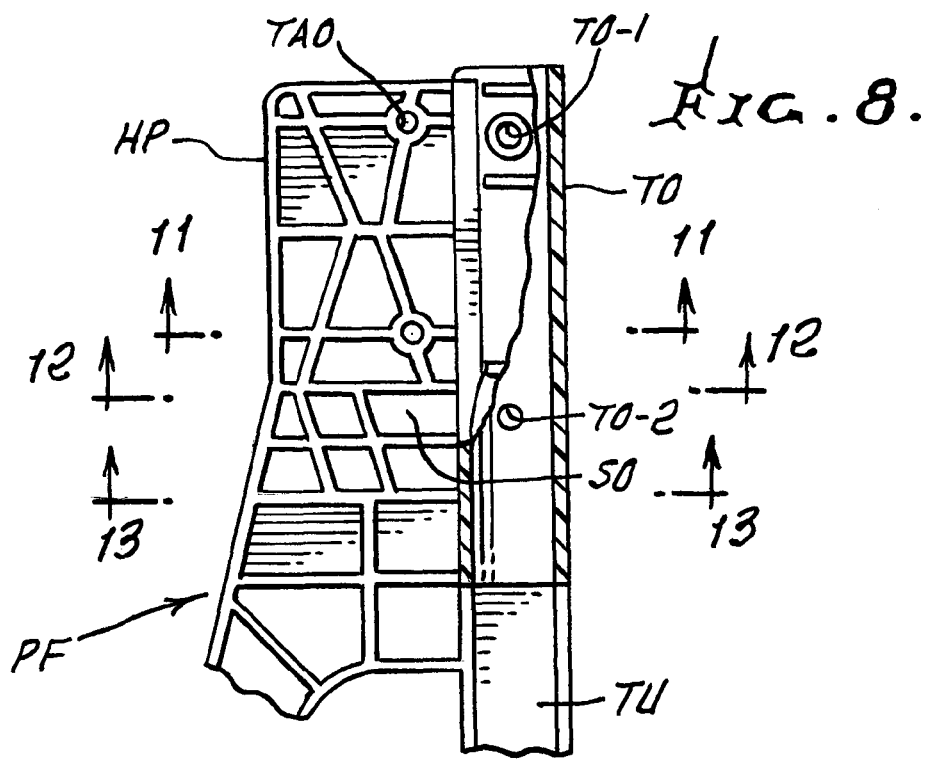
FIG. 8 is a partial, enlarged view of the top portion of the unitary frame as illustrated in FIG. 7, without the cart handle mounted thereon.
Figure 11:
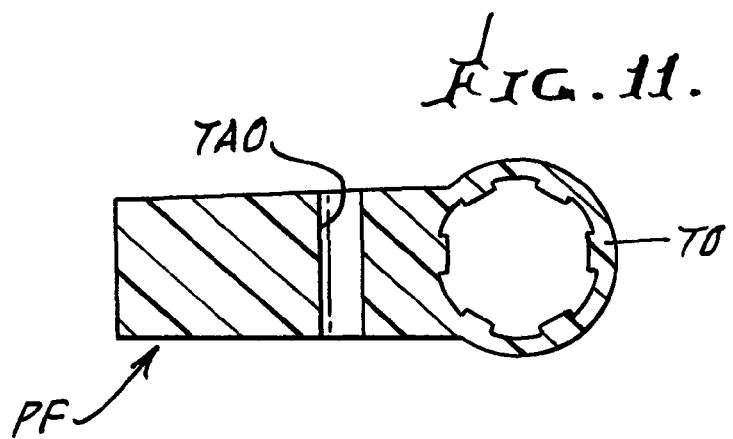
FIG. 11 is a cross-sectional view taken along the line 11-11 of FIG. 8.
Figure 12:
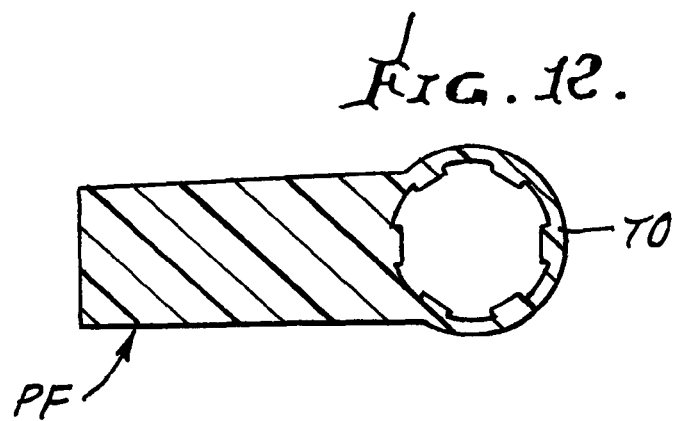
FIG. 12 is a cross-sectional view taken along the line 12-12 of FIG. 8.
Figure 9:
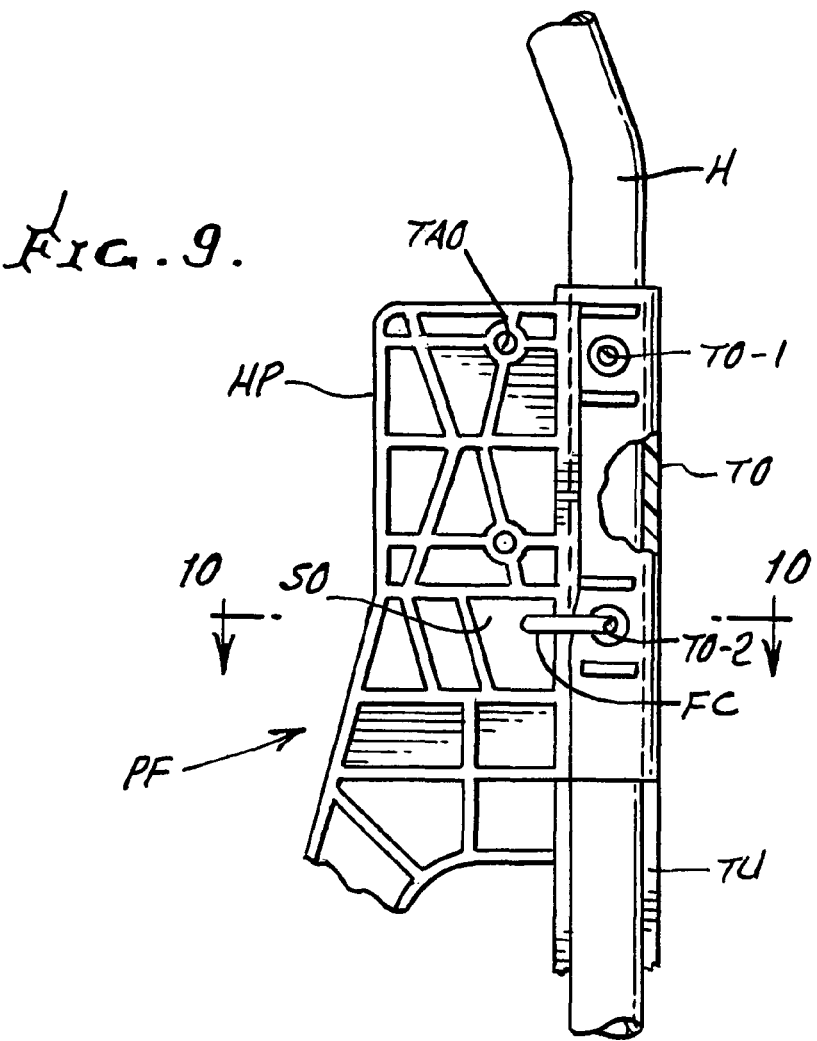
Figure 10:
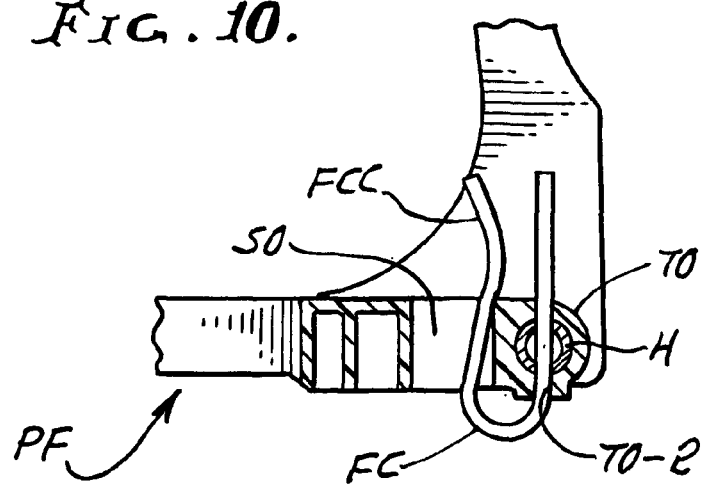
FIG. 10 is a partial, enlarged cross-sectional view taken along the line 10-10 of FIG. 9 illustrating in detail the securement of the cart handle thereto.
Figure 17:
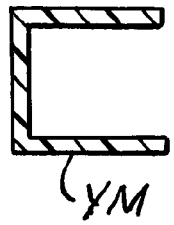
FIG. 17 is a cross-sectional view taken along the line 17-17 of FIG. 7.
Figure 18:
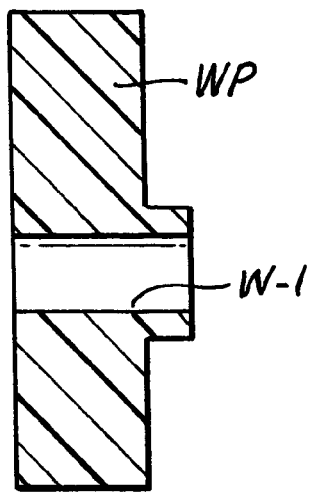
FIG. 18 is a cross-sectional view taken along the line 18-18 of FIG. 7.
Figure 19:
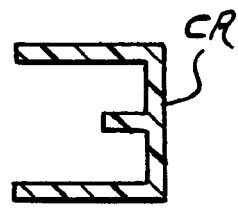
FIG. 19 is a cross-sectional view taken along the line 19-19 of FIG. 6.
Figure 20:
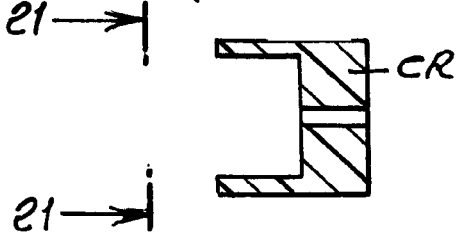
FIG. 20 is a cross-sectional view taken along the line 20-20 of FIG. 6.
Figure 21:
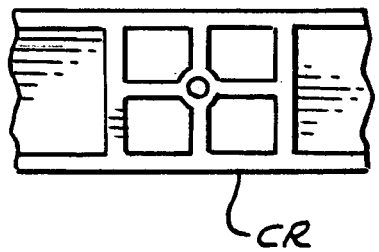
FIG. 21 is a view taken along the line 21-21 of FIG. 20.
Figure 22:
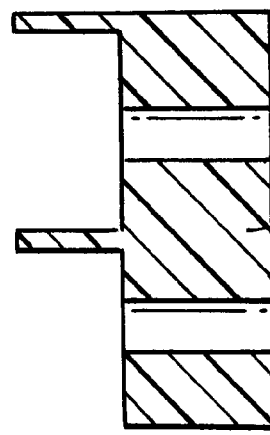
FIG. 22 is a cross-sectional view taken along the line 22-22 of FIG. 6.

Now referring to the drawings, and with particular reference to FIGS. 1-22, the basic construction of a two wheeled hand cart 2W embodying the invention will be described in detail. An important aspect in implementing both the two wheel hand cart and the method of manufacturing the two wheel hand cart 2W is the provision of a one piece, rigid, molded plastic frame PF as best seen in FIG. 4, that allows the remaining conventional elements of hand cart to be readily assembled thereto, as is evident from viewing FIG. 4.

The plastic frame PF comprises a pair of upright side rails SRR and SRL integrally formed with and joined by a plurality of cross rails CR, four cross rails CR are illustrated in a spaced apart relationship between the side rails SRR. Each side rail SRR is arranged in the form of an open truss and comprises a vertically extending upright truss member TU arranged with and joined at its ends with a truss member TL. The truss members Tu and TL are constructed, designed and arranged as an open truss for transmitting and distributing the loads applied to the two wheel cart 2W. Each pair of truss members TU and TL are spaced apart by means of a plurality of Y-like members YM longitudinally spaced between the truss members, two members are illustrated best as viewed in FIG. 7. Each member YM has a straight horizontal section terminating and integral with the associated truss members TU. The arms of the Y-like members YM extend from the outer end of the straight section and terminate and is integral to the truss member TL with the arm defined by openings YO. The bottom portion of the unitary frame PF, the portion below the lower member YM is defined by a grouping of radial webs for carrying and transmitting the loads applied to the hand cart 2W, and is identified by the reference character WP. The portion WP is molded with apertures W-1 and W-2 for receiving an axle A in a non-rotatably relationship, therewith. The apertures W-1 and W-2 are spaced for permitting wheel assemblies of different diameters to be mounted thereto.

The upper portion of the unitary of the unitary frame PF is formed by the merger of the truss members TU and TL at their upper ends. The truss members TU are each formed with a tubular opening TO or handle receiving portion for mounting a cart handle H thereto. Adjacent the tubular openings TO, solid, flat sections are formed on the inside of the sections HP that extend horizontally outwardly from the tubular opening TO, as seen in FIG. 4. The opposite sides of the solid, flat sides are open with a plurality of webs formed on this open side. The entire construction of the unitary frame is of a C-like cross section with the open sides of the C being defined with webs on the outside of the truss members; see FIGS. 4, 6 and 7, for example. In this construction of the unitary frame PF it should be noted that the Y-like members YM each are molded integrally with the horizontal portions of the members YM and in alignment with rails CR and thereby a rigid relationship with the pair of truss members TU and TL result. The topmost cross rail CR is molded integrally with the flat surfaces HP formed by the merged truss members TU and TL; see FIG. 5 the lowest one of the cross rails CR has a pair of enlarged flat mounting surfaces FS formed integrally with the lowest cross rail CR adjacent the ends thereof for permitting a toe plate TP to be secured thereto by a plurality of fasteners F. The toe plate TP, as illustrated is L-shaped with the vertical arm of the plate secured to the flat surfaces FS and thereby directly transmits the loading forces from the toe plate TP to the unitary frame PF (see FIG. 4). The other arm of the toe plate TP rests on the supporting surface for the cart 2W, when secured thereto, for receiving the articles to be loading and transported thereon.

The cross rails CR for the cart 2W are constructed and formed, in accordance with the present invention, with a curved configuration CC intermediate the ends thereof for accommodating round objects to be transformed by the cart 2W. This curved configuration CC is provided so as to prevent a curved or round object from rolling off of the cart 2W when loaded onto the toe plate TP. This is generally aided by strapping the round object to the frame PF.

With the above frame structure for the two wheel cart 2W in mind, the remaining parts associated with the plastic frame structure PF can be readily assembled thereto. For this purpose, in addition to securing the toe plate TP to the flat surfaces FS for the lowest cross-rail CR by means of the fasteners F, an axle A is secured to the frame PF at the lower ends WP by mounting the axle A to a selected one of the openings W-1 or W-2 in accordance with the size of the wheel assemblies to be utilized. As illustrated, the axle A is mounted in the opening W-1, for accommodating a wheel assembly WA including a pneumatic tire, in a non-rotatable relationship with the frame portion WP (see FIG. 1). The pneumatic wheel assemblies WA comprise a conventional wheel mounted to the axle A at the opposite ends thereof outside of the plastic frame PF in a conventional manner. The wheels mount a pneumatic tire but hard rubber tires or other known types may be used.

To complete the assembly of the cart 2W a handle H is secured to the openings TO for the frame PF. A U-shaped handle H is illustrated mounted to the tubular openings TO and is the preferred embodiment but any handle well known in field of hand carts can be employed or a plurality of handles utilized. The U-shaped handle H is preferred and is of tubular construction provided with elongated arms of a length that extend beyond the ends of member TO and reside in the open areas of the C-shaped truss members TU and are then secured to the frame PF; see FIGS. 1-4.

It is important to note that U-shaped handle H illustrated in the drawings is constructed of steel and has arms for a preselected length to reinforce the frame PF. To this end, the handle arms are illustrated as extending beyond the topmost Y-like member YM and terminates intermediate the two members YM. The U-shaped handle H is further secured to the frame PF in a non-movable relationship with the frame PF through the provision of aligned, securing openings in the handle H and the openings in the tubular section TO and the openings in the frame sections HP. The handle openings is identified in the drawings by the reference character HO (see FIG. 4) while the tubular sections each have a pair of vertically aligned openings TO-1 and TO-2 with a relatively large quadrilateral opening SO spaced adjacent the lower tubular opening TO-2 for receiving a handle pin or clip for more secure connection between the handle H and the frame PF. A fastening clip FC in the form of a U-shaped, steel clip with one arm FCC of the clip FC bent inwardly and outwardly for securement purposes, as best illustrated in FIG. 4 and is the presently preferred securing device. For the purpose of securing the handle H to the plastic frame PF, the arms of the handle H are inserted into the tubular openings TO until the handle opening HO is in horizontal alignment with the tubular opening TO-2 for both tubular sections TO, and then the clip FC is positioned with one arm in the opening TO-2 along with the arm FCC inserted in the opening SO. The fastening clips FC are each forced into the opening SO and TO-2 by springing the arms of the clip apart against the adjacent wall of the tubular opening TO forming one end of the opening SO to function as a spring clip to maintain the handle H in a non-movable position with the frame PF. Other types of securing clips known to those workers in the art may also be utilized for this purpose. When the hand cart is to be converted to a four wheel cart, the clip FC may be pulled out of their secured position and the handle H pulled out of the sockets TO and utilized in the four wheel configuration. When the clips FC are secured in the above described locations, the assembly of the two wheel hand cart is complete as illustrated in FIG. 1.

Figure 23:
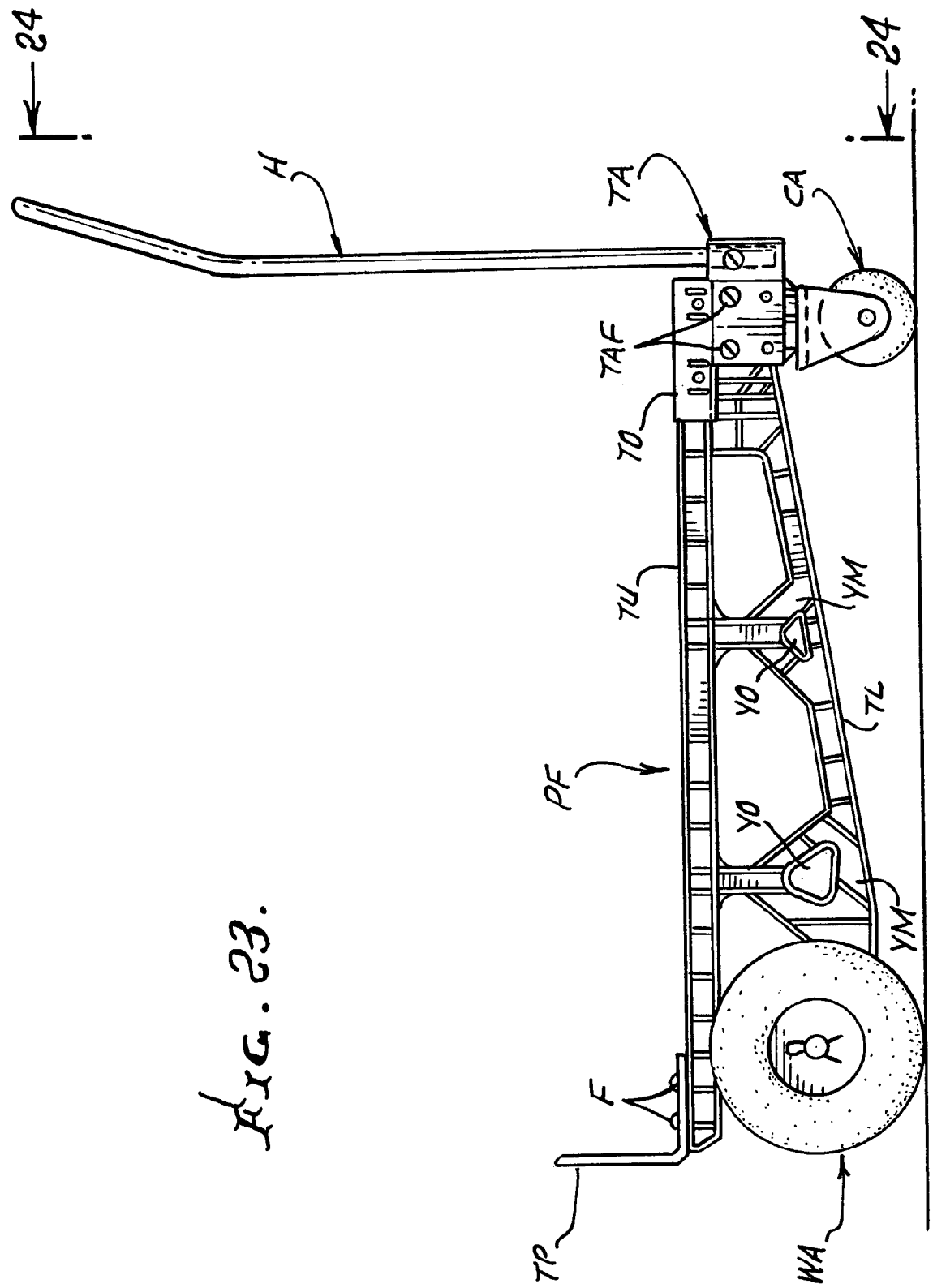
FIG. 23 is a side elevational view of the hand cart of FIG. 1 converted to a four wheel, horizontal platform hand cart.
Figure 24:
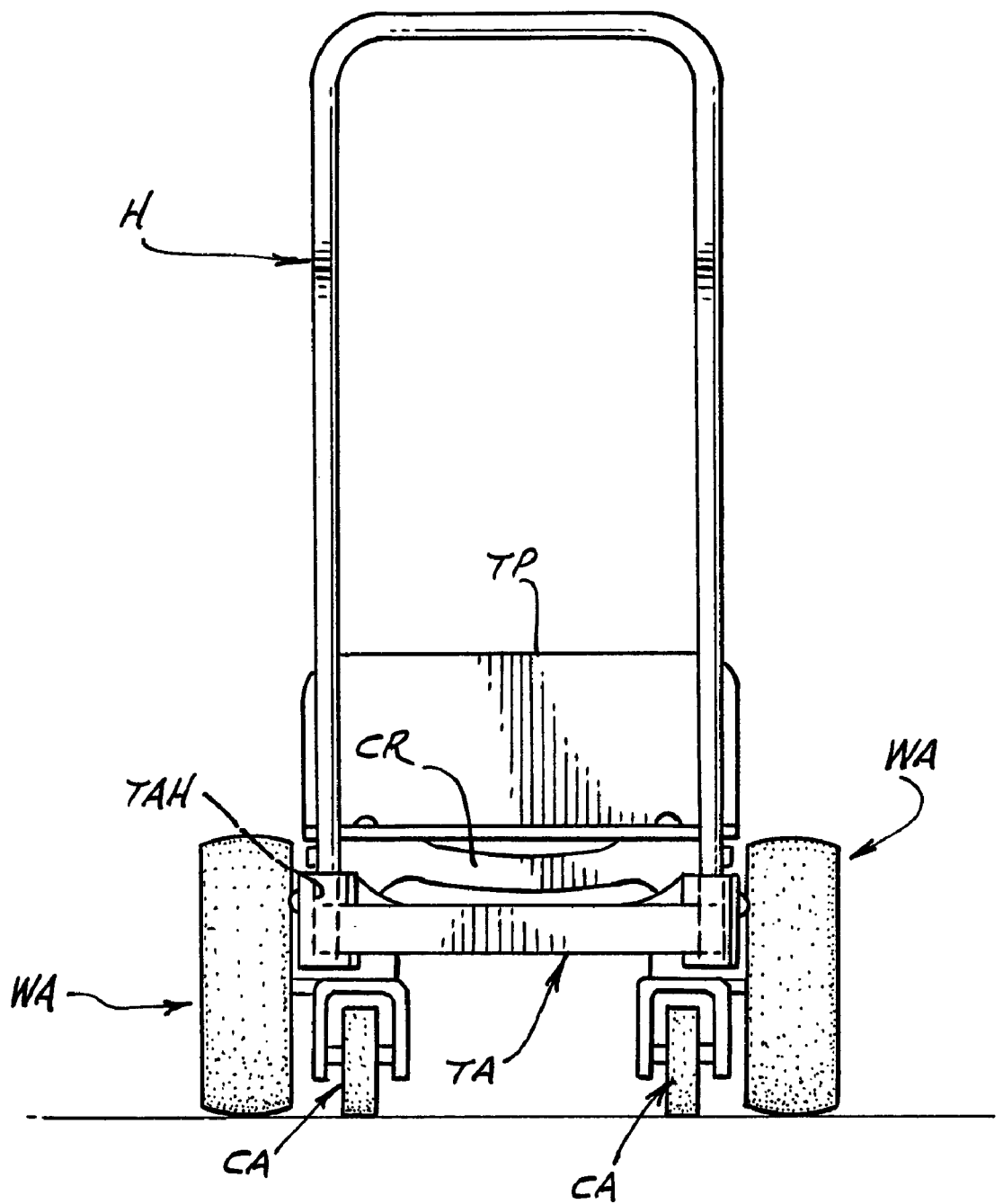
FIG. 24 is a view taken along the line 24-24 of FIG. 23.
Figure 27:
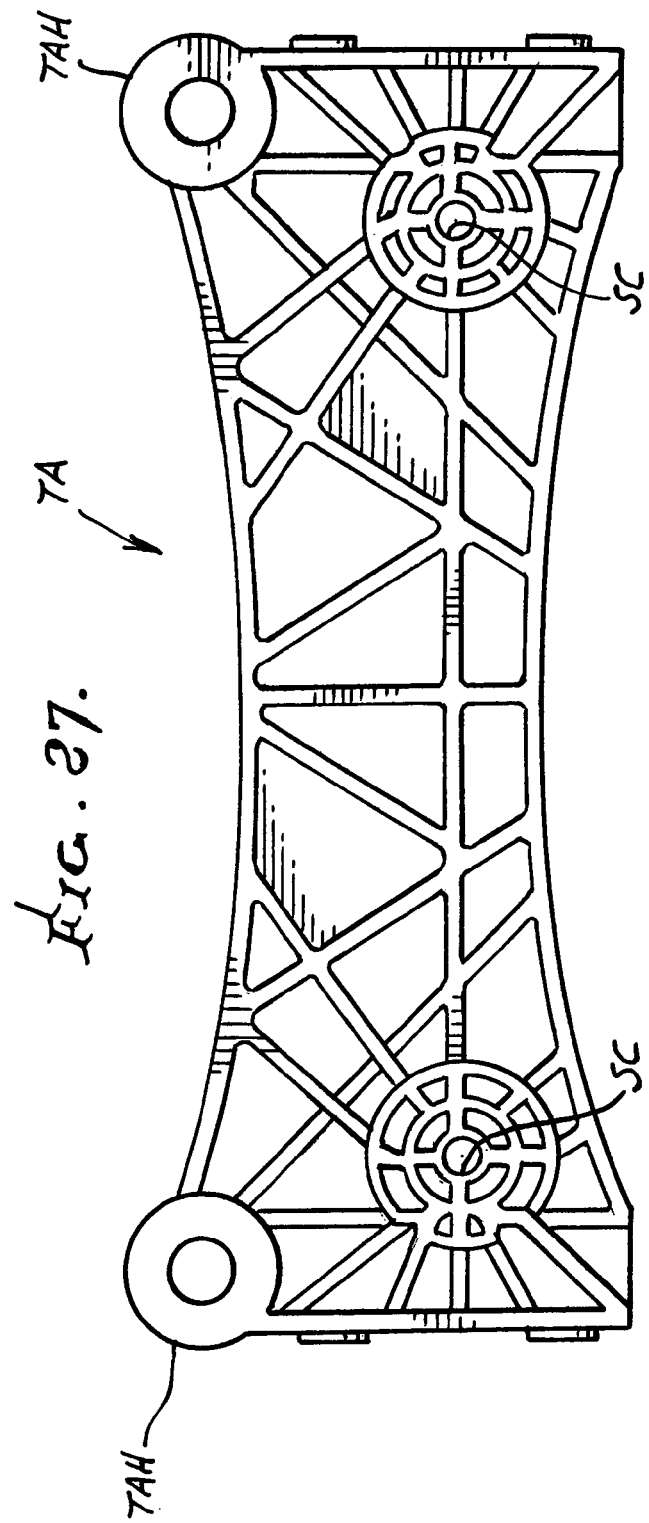
FIG. 27 is a bottom plan view of the conversion attachment as illustrated in FIG. 25.
Figure 28:
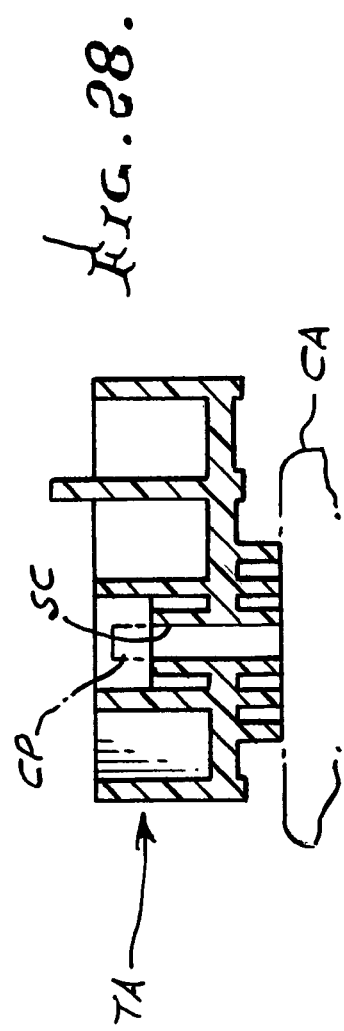
FIG. 28 is a cross-sectional view taken along the line 28-28 of FIG. 25 and illustrating in dotted outline the securing pin and caster wheels.

With the above two wheel hand cart structure in mind, the conversion of the two wheel hand cart 2W will now be described with particular reference to FIGS. 23-30. This is accomplished by the provision of conversion attachment illustrated in FIGS. 25-28. FIG. 23 illustrates the completed conversion of the hand cart 2W to the four wheel configuration utilizing the same U-shaped handle H for the two wheel configuration.

The conversion from the two wheel configuration to the four wheel configuration is accomplished with the provision of a transition member or attachment adapted to be mounted to the unitary single frame PF and to be carried by the frame. The transition attachment TA is best viewed in FIGS. 25-27. To commence the conversion, the handle H is disconnected from the frame PF and withdrawn from the handle receiving sockets TO for use in the four wheel configuration.

Figure 29:
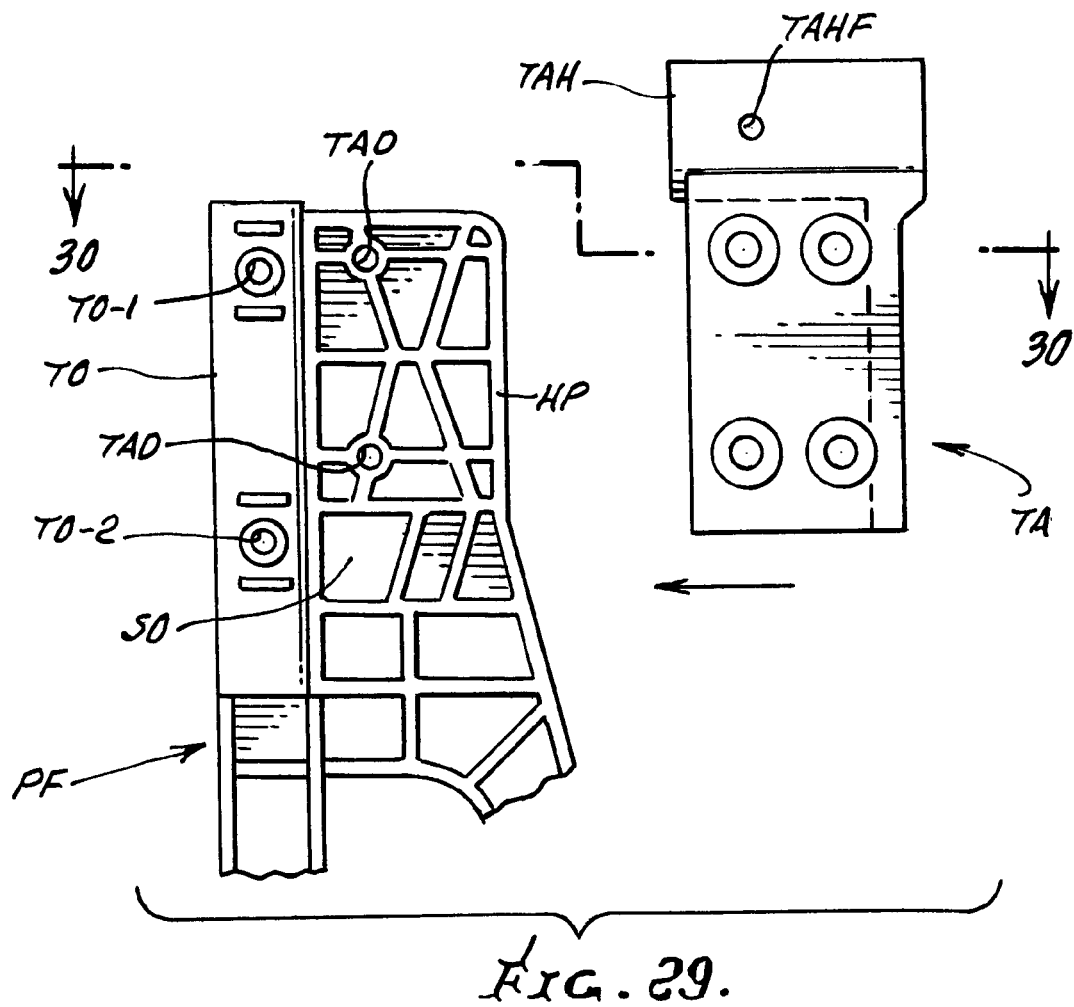
FIG. 29 is a partial view of the top portion of the unitary frame, as illustrated in FIG. 7, and illustrating the orientation of the conversion attachment for mounting to the unitary frame.
Figure 30:
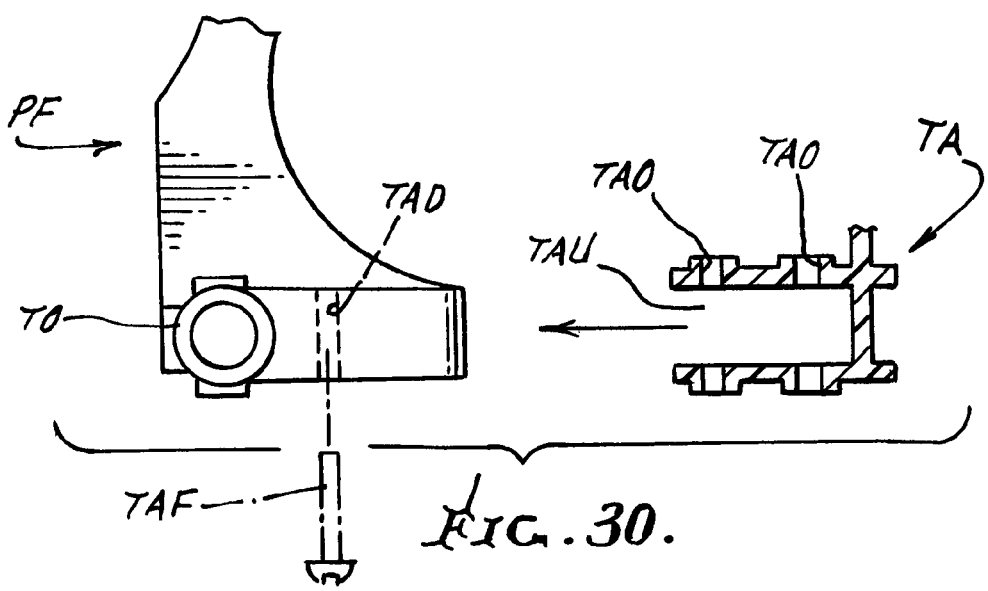
FIG. 30 is a view taken along the line 30-30 of FIG. 29 and illustrating the fastener for the handle in dotted outline, when mounted to the conversion attachment.

The transition attachment TA comprises a single member adapted to be mounted to the side rails and secured thereto at the flat surfaces HP from the back side of the plastic frame PF; see FIG. 29. The attachment TA is provided with means for mounting in a spaced apart relationship a pair of wheel assemblies, preferably swiveling caster assemblies CA, along with means for mounting a cart handle H in a perpendicular relationship to the hand cart single frame PF. The cart handle H, utilized for the two wheel configuration, is mounted to the transition attachment TA once the transition attachment TA is secured to the plastic frame PF to form the complete assembly of the four wheel configuration defining a horizontal loading platform as best illustrated in FIG. 23. For the purposes of attachment of the transition attachment TA to the plastic frame PF, the attachment is constructed, defined and proportioned with a length L, illustrated in FIGS. 1 and 25 to span the distance between the side rails SRR and SRL of the plastic frame PF when the two wheel hand cart 2W is in the upright position illustrated in FIG. 1. To this end, the transition attachment TA is constructed, designed and formed with straight walls forming U-like openings TAU at opposite ends of the length L (see FIG. 25) and pre-selected widths for slidably receiving, in a press fit relationship, the opposite flat surfaces HP of the frame as best illustrated in FIG. 29. The openings TAU are open at one end for slidably positioning onto the surface HP for the frame. The opposite end of the openings TAU are closed by the provision of tubular, handle receiving opening or sockets TAH for slidably receiving the two arms of the U-shaped handle H to be individually mounted in the spaced tubular openings or sockets TAH. The sockets TAH are each provided with a fastener opening TAHF extending through the side walls of the tubular opening TAH for securing the handle H positioned therein from movement so that when the handle is positioned therein with the handle openings TAHO (see FIG. 4) is vertically aligned with the openings TAHF for the socket TAH. The fastener holds the handle in a non-movable position, lengthwise, as best illustrated in dotted outline in FIG. 26.

The transition attachment TA is provided with spaced apart opening SC for mounting a pair of wheel assemblies in the form of swiveling caster assemblies SC. The openings SC are aligned and spaced adjacent the openings TAU as viewed in FIGS. 25 and 27. The caster wheel assemblies CA illustrated are secured in position by a cotter pin CP as illustrated in dotted outline in FIG. 28 so that the wheel assemblies CA ride on the supporting surface as the wheel assemblies WA for providing the four wheel configuration of the present invention. The wheel assemblies are secured to the attachment TA in the described positions in both the two and four wheel configurations.

The flat surfaces HP of the frame PF are provided with securing apertures TAD for securing the transition attachment TA to the frame PF in a non-movable relationship. Similarly the transition attachment TA is provided with a plurality of securing apertures TAO to be aligned with the apertures TAD and when aligned receive a fastener TAF for securing the attachment TA to the frame PF in a non-movable relationship, as can be best appreciated from viewing FIGS. 29 and 30.

The transition attachment TA has been illustrated and described as being molded of the same plastic as the frame PF in one piece for attachment to the frame. The transition attachment TA, however can be constructed of a metallic material for securement to the frame PF to convert the hand cart to the four wheel configuration. Alternatively, the design may be changed so it is integral with the frame PF and merely have means for permanently securing the wheel assemblies CA to the frame and means for securing a handle thereto.

With the above described structure, it should now be known that with the transition attachment TA secured to the single frame PF it will normally have the wheel assemblies CA secured thereto. If a U-shaped handle H is used for the two wheel, upright vertical loading cart of FIG. 1, the wheel assemblies CA are normally mounted to the attachment TA at the top of the frame PF as described and carried by the frame while maintained in an upright vertical loading orientation. Conversion of the above described two wheel configuration is produced simply by removing any handle H held in the sockets TO and lowering the frame PF to a horizontal position so that the wheel assemblies WA and CA are all supported at the same level on a supporting surface. The four wheel configuration is completed by inserting a U-shaped handle or the illustrated U-shaped handle H for the two wheel configuration in the tubular sockets TAH provided for the transition attachment TA adjacent the opposite ends and secured in place by a fastener, as indicated in FIG. 26, and thereby completes the four wheel configuration, illustrated in FIGS. 23 and 24. In this four wheel configuration, the hand cart can be re-converted to a two wheel hand cart by simply removing the fasteners for the transition sockets TAH and withdrawing the handle H from the sockets. The frame PF can then be elevated to its vertical orientation and the handle H positioned into the sockets TO to function as the illustrated handle H of FIG. 1 or an equivalent handle can be utilized. The handle H is secured by means of the fastener FC so as to complete the two wheel handle cart 2W configuration.

It should now be appreciated that the above described structures provide a one piece, molded plastic frame comprising the complete side rails and cross rails for a two wheel hand cart exhibiting improved strength and so as to avoid the problems of prior art structures that require the parts to be designed and formed as individual elements to be connected together. The one piece molded plastic frame can be constructed of a high strength, engineered polymer plastic. The resulting one piece frame results in a simplified manufacturing and assembly procedures when the improved frame is utilized in the two wheel hand cart configuration or four wheel configuration.

The invention claimed is:

1. A two wheeled hand cart comprising a pair of side rails joined by spaced apart cross rails constructed, formed and designed of a molded, engineered polymer plastic in the form of a continued single, rigid unitary piece, one end of each side rail being adapted for receiving and securing a cart handle,
   a cart handle mounted to said side rails at said handle receiving ends, wherein the side rails have a substantially C-shaped cross sections and the cart handle is U-shaped with arms of pre-selected length that extend beyond the receiving ends of the side rails, and reside within the C-shaped side rails,
   a wheel axle mounted to said frame and extending between the side rails adjacent the opposite ends of the frame from the handle receiving ends,
   individual wheel assembles to opposite ends of said axle on the outside of said side rails, and a toe plate for receiving and carrying loads to be transported by said hand cart secured to the single frame at the opposite ends of the single frame from the handle receiving ends for directly transmitting the load applied to said single frame.

2. A two wheeled hand cart comprising a single molded plastic rigid frame comprising a pair of longitudinally extending side rails joined by a plurality of integrally formed cross rails spaced apart along the side rails on one side of the side rails each including a further longitudinally extending side rail arranged with and joined to the first mentioned side rails of each pair of side rails at the opposite ends thereof and arranged therewith in the form of an open truss,
   a plurality of truss members spaced between the longitudinally extending side rails forming an individual open truss and located at the cross rails on another side of the side rails from the cross rails and integrally formed therein between the opposite ends of the longitudinally extending side rails of the truss,
   each of said pair of side rails including ends formed to receive an individual end of a cart handle thereon and secured thereto,
   the entire frame being molded with a pre-selected plastic to form a single, molded plastic, rigid frame functioning as a single, plastic piece made up of said side rails cross bars and truss members,
   a U-shaped handle having its ends mounted to the ends for each of the side rails, said side rails have a C-shaped cross section and said U-shaped handle has arms that extend a pre-selected distance beyond the ends of the tubular ends for receiving a handle for the side rails and fitting within said side rails for reinforcing the side rails,
   a wheel axle secured to the frame and extending between the side rails and through the side rails adjacent the opposite end of said frame from the cart handle receiving ends,
   wheel assemblies mounted to said axle on the outside of said side rails, and a L-shaped toe plate secured to the end of said frame adjacent said wheel assemblies for receiving and transporting loads mounted thereon and directly transmitting the loads applied thereto to said single frame.

3. A two-wheeled hand cart comprising a single molded plastic rigid frame comprising a pair of longitudinally extending side rails joined by a plurality of integrally formed cross rails spaced apart along the side rails on one of the side rails each including a further longitudinally extending side rail arranged with and joined to the first mentioned side rails of each pair of side rails at the opposite ends thereof and arranged therewith in the form of an open truss, a plurality of truss members spaced between the longitudinally extending side rails forming an individual open truss and located at the cross rails on another side of the side rails from the cross rails and integrally formed therewith between the opposite ends of the longitudinally extending side rails of the truss, each of said pair of side rails including ends formed to receive an individual end of a cart handle thereon and secured thereto, the entire frame being molded with a pre-selected plastic to form a single, molded plastic, rigid frame functioning as a single, plastic piece made up of said side rails, cross rails and truss members, a U-shaped handle having its ends mounted to the ends for each of the side rails, a wheel axle secured to the frame and extending between the side rails and through the side rails adjacent the opposite end of said frame from the cart handle receiving ends, wheel assemblies mounted to said axle on the outside of said side rails, and a L-shaped toe plate secured to the end of said frame adjacent said wheel assemblies for receiving and transporting loads mounted thereof and directly transmitting the loads applied thereto to said single frame, said side rails have a C-shaped cross section and said U-shaped handle has arms that extend a pre-selected distance beyond the ends of the tubular ends for receiving a handle for the side rails and fitting within said side rails for reinforcing the side rails, said cross rails have a curved configuration for accommodating a variety of loads including round articles loaded onto the hand cart for accommodating the loads and minimizing the rolling of the round articles off the cart including when strapped thereto.

4. A two wheel hand cart for vertical loading and convertible to a four wheel hand cart having a horizontal loading platform, said hand cart comprising a single frame comprising a pair of side rails joined by spaced apart cross rails constructed and designed in the form of a single, rigid, unitary piece, one end of each side rail being adapted for receiving a cart handle, a cart handle mounted to said side rails at said handle receiving end thereof, an axle and a pair of wheels mounted to said axle and secured to said single frame adjacent the opposite end of said frame from said cart handle, a toe plate secured to said frame adjacent the axle for receiving and transporting loads, and a transition member adapted to be mounted to said single frame between the side rails thereto adjacent said handle receiving end to be carried by the frame, said transition member comprising means for mounting a pair of spaced wheel assemblies thereto, and means for mounting said cart handle for the two wheel cart thereto to extend perpendicular to the plane of said single frame when said cart handle is removed from the handle receiving ends of said side rails and is mounted to said transition's member means for mounting a cart handle, and wheel assemblies mounted to said transition member at said means for mounting wheel assemblies to function as the four wheel cart when all of the wheels engage a supporting surface.

5. A method of manufacturing and assembly of a two wheel hand cart including the steps of molding of an engineered polymer plastic a unitary frame structure comprising a pair of side rails and cross rails integrally formed therewith, securing a handle to one end of the unitary frame at said side rails for manually propelling the completed two wheel hand cart, securing a non-rotatable wheel axle to said unitary frame adjacent the opposite end of the unitary frame from said one end securing said handle, mounting individual wheel assemblies adjacent opposite ends of said mounted axle with each wheel assembly engaging a supporting surface for propelling the completed hand cart, providing a substantially L-shaped plate having two arms arranged at right angles, arranging one arm of said plate for engaging the supporting surface for receiving and transporting loads to be carried by the completed hand cart and securing the other arm of said plate to said unitary frame for completing the hand cart structure, providing a transition attachment including means for mounting a pair of wheel assemblies in a spaced apart relationship thereon and means for releasably mounting a cart handle thereto to extend in a substantially perpendicular relationship with said unitary frame for converting the two wheel hand cart to a four wheel hand cart having a horizontal platform for supporting loads to be carried, slip fitting said transition attachment onto said unitary frame adjacent said one end of said frame to extend between said pair of side frames of said unitary frame for mounting a handle thereto to be supported by said frame so said means for releasably mounting said handle onto said attachment extends substantially perpendicular to the plane of said single frame, removing the handle from said one end of said single frame mounting the cart handle, positioning a U-shaped handle onto said transition attachment at said means for releasably mounting the handle so that the mounted handle extends substantially perpendicular to the plane of said single handle, and positioning individual wheel assemblies in each of said means for mounting a wheel assembly for said transition attachment for completing the transition to a four wheel hand cart having a horizontal loading platform supported by and propelled by means of said four wheel assemblies.

6. A method of manufacturing and assembly of a two wheel hand cart including the steps of molding of an engineered polymer plastic a unitary frame structure comprising a pair of side rails and cross rails integrally formed therewith, securing a handle to one end of the unitary frame at said side rails for manually propelling the completed two wheel hand cart, securing a non-rotatable wheel axle to said unitary frame adjacent the opposite end of the unitary frame from said one end securing said handle, mounting individual wheel assemblies adjacent opposite ends of said mounted axle with each wheel assembly engaging a supporting surface for propelling the completed hand cart providing a substantially L-shaped plate having two arms arranged at right angles, arranging one arm of said plate for engaging the supporting surface for receiving and transporting loads to be carried by the completed hand cart and securing the other arm of said plate to said unitary frame for completing the hand cart structure, providing a transition attachment including means for mounting a pair of wheel assemblies in a spaced apart relationship thereon and means for releasably mounting a cart handle thereto to extend in a substantially perpendicular relationship with said unitary frame for converting the two wheel hand cart to a four wheel hand cart having a horizontal platform for supporting loads to be carried, molding said transition attachment of plastic and includes U-shaped elements to be slip fitted into place onto said unitary frame in a slip fit relationship, slip fitting said transition attachment onto said unitary frame adjacent said one end of said frame for mounting a handle thereto to be supported by said frame so said means for releasably mounting said handle onto said attachment extends substantially perpendicular to the plane of said single frame, securing said attachment to said frame in a non-movable relationship, removing the handle from said one end of said single frame mounting the cart handle, positioning a U-shaped handle onto said transition attachment at said means for releasably mounting the handle so that the mounted handle extends substantially perpendicular to the plane of said single frame, and positioning individual wheel assemblies in each of said means for mounting a wheel assembly for said transition attachment for completing the transition to a four wheel hand cart having a horizontal loading platform supported by and propelled by means of said four wheel assemblies.

7. A method as defined in claim 6 wherein said wheel assemblies comprise individual caster wheel assemblies mounted to each of said means for mounting and holding a wheel assembly for said transition attachment so as to extend outwardly of said attachment in the opposite direction from a mounted cart handle secured to said transition attachment.

8. A two wheel hand cart comprising a single molded plastic frame comprising a pair of longitudinally extending side rails joined by a plurality of integrally formed cross rails spaced apart along the side rails on one side of the side rails, the side rails each including a further longitudinally extending side rail arranged in a spaced relationship with the first mentioned side rail and joined to the first mentioned side rail of each pair of side rails at the opposite ends thereof and arranged therewith in the form of an open truss, a plurality of truss members spaced between the longitudinally extending side rails forming an individual open truss and located at the cross rails on another side of the side rails from the cross rails and integrally formed therewith by molding the opposite ends of the longitudinally extending side rails of the truss to thereby form a rigid framework, said plurality of truss members are longitudinally spaced along the truss, each comprising Y-shaped members extending between the members and molded integrally therewith for forming the open truss, each of said pair of side rails including ends formed and adapted for receiving a cart handle to be secured thereto, the opposite ends of said pair of side rails being formed for securing a wheel axle to the single frame and extending between the pairs of side rails and through the side rails adjacent the opposite ends of said frame from the cart handle receiving end for defining a two wheel hand cart, the entire frame being molded to form a single, molded plastic, rigid frame functioning as a single, plastic piece made up of said side rails, cross rails and truss members for supporting a load over a wide area.

9. A two wheel hand cart comprising a single molded plastic frame comprising a pair of longitudinally extending side rails joined by a plurality of integrally formed cross rails spaced apart along the side rails on one side of the side rails, the side rails each including a further longitudinally extending side rail arranged in a spaced relationship with the first mentioned side rail and joined to the first mentioned side rail of each pair of side rails at the opposite ends thereof and arranged therewith in the form of an open truss, a plurality of truss members spaced between the longitudinally side rails forming an individual open truss and located at the cross rails on another side of the side rails from the cross rails and integrally formed therewith by molding the opposite ends of the longitudinally extending side rails of the truss to thereby form a rigid framework, said plurality of truss members are longitudinally spaced along the truss, and each comprising Y-shaped members extending between the members and molded integrally therewith for forming the open truss and wherein said Y-shaped member comprise a straight section molded at the juncture of one side frame with side cross bars and having a pair of arms extending outwardly from adjacent one end of said straight section in a spaced relationship and molded to the other one of a pair of side frames, each of said pair of side rails including ends formed and adapted for receiving a cart handle to be secured thereto, the opposite ends of said pair of side rails being formed for securing a wheel axle to the single frame and extending between the pairs of side rails and through the side rails adjacent the opposite ends of said frame from the cart handle receiving end for defining a two wheel hand cart, the entire frame being molded to form a single, molded plastic, rigid frame functioning as a single, plastic piece made up of said side rails, cross rails and truss members for supporting a load over a wide area.

10. A two wheel hand cart comprising a single molded plastic frame comprising a pair of longitudinally extending side rails joined by a plurality of integrally formed cross rails spaced apart along the side rails on one side of the side rails, the side rails each including a further longitudinally extending side rail arranged in a spaced relationship with the first mentioned side rail and joined to the first mentioned side rail of each pair of side rails at the opposite ends thereof and arranged therewith in the form of an open truss, a plurality of truss members spaced between the longitudinally side rails forming an individual open truss and located at the cross rails on another side of the side rails from the cross rails and integrally formed therewith by molding the opposite ends of the longitudinally extending side rails of the truss to thereby form a rigid framework, said plurality of truss members are longitudinally spaced along the truss, each comprising Y-shaped members extending between the members and molded integrally therewith for forming the open truss, and wherein said Y-shaped members have a C cross section, each of said pair of side rails including ends formed and adapted for receiving a cart handle to be secured thereto, the opposite ends of said pair of side rails being formed for securing a wheel axle to the single frame and extending between the pairs of side rails and through the side rails adjacent the opposite ends of said frame from the cart handle receiving end for defining a two wheel hand cart, the entire frame being molded to form a single, molded plastic, rigid frame functioning as a single, plastic piece made up of said side rails, cross rails and truss members for supporting a load over a wide area.

11. A method as defined in claim 5 wherein said wheel assemblies comprise individual caster wheel assemblies mounted to each of said means for mounting and holding a wheel assembly for said transition attachment so as to extend downwardly of said attachment in the opposite direction from a mounted cart handle secured to said transition attachment.

12. A two wheel hand cart comprising a single molded plastic, rigid frame comprising a pair of longitudinally extending side rails joined by a plurality of integrally formed cross rails spaced apart along the side rails on one side of the side rails, the side rails each including a further longitudinally extending side rail arranged in a spaced relationship with the first mentioned side rail and joined to the first mentioned side rail of each pair of side rails at the opposite ends thereof and arranged therewith in the form of an open truss, a plurality of truss members spaced between the longitudinally extending side rails forming an individual open truss and located at the cross rails on another side of the side rails from the cross rails and integrally formed therewith by molding between the opposite ends of the longitudinally extending side rails of the truss to thereby form a rigid framework, said plurality longitudinally spaced members along the truss for of the side frames comprise Y-shaped member having a C cross section, each of said pair of side rails including ends formed and adapted for receiving a cart handle to be secured thereto, the opposite ends of said pair of side rails being formed for securing a wheel axle to the single frame and extending between the pairs of side rails through the side rails adjacent the opposite ends of said frame from the cart handle receiving end for defining a two wheel hand cart, the entire frame being molded to form a single, molded plastic, rigid frame functioning as a single, plastic piece made up of said side rails, cross rails and truss members for supporting a load over a wide area.

\* \* \* \* \*